US012537847B2

(12) United States Patent
Mitev et al.

(10) Patent No.: US 12,537,847 B2
(45) Date of Patent: Jan. 27, 2026

(54) CYBER SECURITY PHISHING CAMPAIGN

(71) Applicant: OutThink Ltd, London (GB)

(72) Inventors: Simeon Mitev, Sofia (BG); Javi Mollà Micó, Valencia (ES); Donnacha Kirk, Belfast (GB)

(73) Assignee: OutThink Ltd, London (GB)

( * ) Notice: Subject to any disclaimer, the term of this patent is extended or adjusted under 35 U.S.C. 154(b) by 107 days.

(21) Appl. No.: 18/489,978

(22) Filed: Oct. 19, 2023

(65) Prior Publication Data

US 2025/0133102 A1 Apr. 24, 2025

(51) Int. Cl.
*H04L 9/40* (2022.01)

(52) U.S. Cl.
CPC ...... *H04L 63/1433* (2013.01); *H04L 63/1483* (2013.01)

(58) Field of Classification Search
None
See application file for complete search history.

(56) References Cited

U.S. PATENT DOCUMENTS 8,484,741 B1 * 7/2013 Chapman ............ H04L 63/1483 709/206
10,021,126 B2 * 7/2018 Irimie ................. H04L 63/1483
10,348,762 B2 7/2019 Sites
10,749,887 B2 * 8/2020 Hawthorn ........... H04L 63/1433
10,855,714 B2 12/2020 Irimie et al.
11,489,868 B2 * 11/2022 Grealish ............ H04L 63/1425
11,563,767 B1 * 1/2023 Rodriguez .......... H04L 63/1433
11,777,977 B2 10/2023 Irimie et al.
12,041,087 B1 * 7/2024 Morris ................ H04L 63/1425
2016/0308897 A1 * 10/2016 Chapman .............. G06F 40/186
2017/0244746 A1 * 8/2017 Hawthorn ............... G06F 21/55
2017/0251010 A1 * 8/2017 Irimie ..................... H04L 63/20
2021/0075827 A1 * 3/2021 Grealish ............. H04L 63/1483
2021/0295213 A1 * 9/2021 Raveh .................. G06V 10/764
2021/0365866 A1 * 11/2021 Kras ..................... G06F 21/552
2021/0390181 A1 * 12/2021 McClay ................. G06N 20/00
2022/0070214 A1 * 3/2022 Kras ...................... G06N 20/00
2022/0116419 A1 * 4/2022 Kelm .................. H04L 63/1483
2022/0197997 A1 * 6/2022 Tyler ................... H04L 63/1466
2022/0377101 A1 * 11/2022 Kras ................... H04L 63/1483
2023/0081399 A1 * 3/2023 Murphy ........... G06Q 10/06395 705/7.42
2023/0308471 A1 * 9/2023 Kras ................... H04L 63/1483

(Continued)

FOREIGN PATENT DOCUMENTS

WO WO 2019/108625 A1 11/2018

*Primary Examiner* — Khang Do
(74) *Attorney, Agent, or Firm* — Dority & Manning, P.A.

(57) ABSTRACT

Embodiments describe herein relate to the automatic generation of personalised phishing communications for a target user within an organization. The content of a phishing communication is generated based on a generative artificial intelligence algorithm. In certain embodiments, data associated with the target user is as a part of a prompt to the generative artificial intelligence algorithm, enabling personalised content to be created. In further embodiments, we describe the use of templates associated with various parameters to be used as part of the prompt, which allows the content of the phishing communication to be customised according to the training requirements of a target user with minimal administrative input.

20 Claims, 5 Drawing Sheets

Select one or more users — 610

Access data associated with each of the one or more users — 620

Generate content of phishing communication for each of the one or more users — 630

Send phishing communication(s) — 640

Track and store response of one or more users — 650

600

(56) References Cited

U.S. PATENT DOCUMENTS

| | | | | |
|---|---|---|---|---|
| 2024/0096234 | A1* | 3/2024 | Brennan | G09B 19/0053 |
| 2024/0314164 | A1* | 9/2024 | Richardson | H04L 63/1483 |
| 2024/0406210 | A1* | 12/2024 | Sellars | G06F 9/45558 |
| 2024/0414190 | A1* | 12/2024 | Lal | H04L 63/1416 |
| 2025/0007950 | A1* | 1/2025 | Wuest | H04L 63/1483 |
| 2025/0080579 | A1* | 3/2025 | Mushtaq | H04L 63/1483 |
| 2025/0112953 | A1* | 4/2025 | Uniyal | G06T 19/006 |

* cited by examiner

Figures 7, 8:
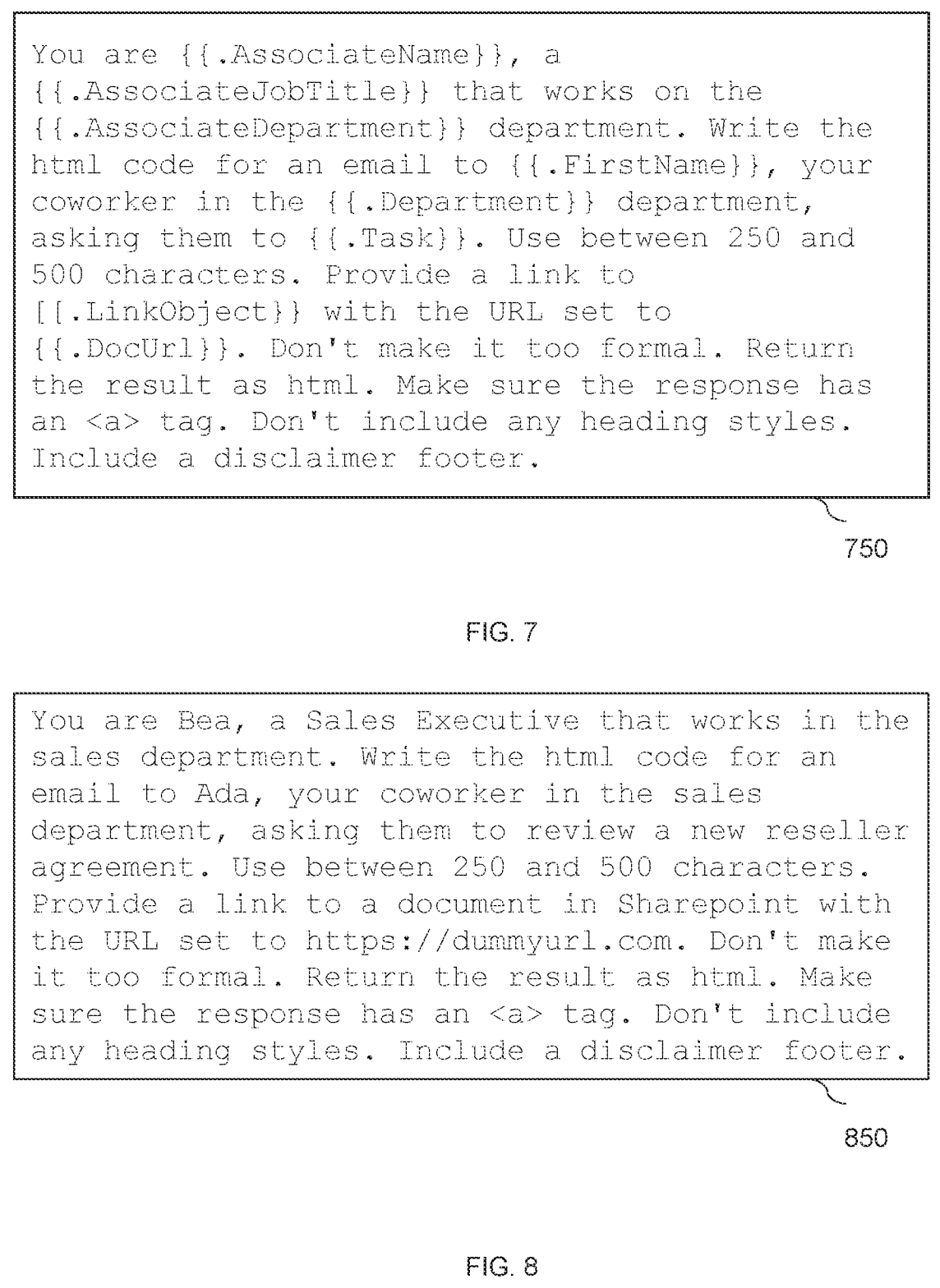

You are {{.AssociateName}}, a {{.AssociateJobTitle}} that works on the {{.AssociateDepartment}} department. Write the html code for an email to {{.FirstName}}, your coworker in the {{.Department}} department, asking them to {{.Task}}. Use between 250 and 500 characters. Provide a link to [[.LinkObject}} with the URL set to {{.DocUrl}}. Don't make it too formal. Return the result as html. Make sure the response has an <a> tag. Don't include any heading styles. Include a disclaimer footer.

You are Bea, a Sales Executive that works in the sales department. Write the html code for an email to Ada, your coworker in the sales department, asking them to review a new reseller agreement. Use between 250 and 500 characters. Provide a link to a document in Sharepoint with the URL set to https://dummyurl.com. Don't make it too formal. Return the result as html. Make sure the response has an <a> tag. Don't include any heading styles. Include a disclaimer footer.

CYBER SECURITY PHISHING CAMPAIGN

FIELD

The present invention relates to methods and systems for the automated generation of simulated phishing communications as part of a simulated phishing campaign, in particular through the use of generative artificial intelligence algorithms.

BACKGROUND

Phishing is a primary cybersecurity threat faced by organizations, whereby malicious actors seek to access sensitive information from users. Malicious actors may prompt users within target organizations to disclose their personal information or credentials by sending a communication to the user purporting to originate from a trusted person or organization either inside or outside the target organization. The communications can be sent to a range of users or directly targeted at specific users via email, instant message, SMS, or other means. When specific users are targeted, malicious actors often use information about that user such as their job role or past interactions with third party services to make their malicious communications appear more believable.

Organizations may conduct simulated phishing campaigns in order to make their users more resilient in the face of these threats. In a simulated phishing campaign, a number of communications are sent to users employing the same social engineering techniques as genuine malicious communications. However, the content and generation of these messages are entirely within the control of the organization itself, or any third party creating and distributing these communications on their behalf. The communications sent as part of a simulated phishing campaign can be deployed at different intervals, employ different social engineering techniques, and achieve various levels of difficulty for the target user. As part of the campaign, records are kept of the messages sent to each user and any response made by respective users. Responses can include ignoring a communication, reporting it as suspicious, replying and providing credentials to the sender.

U.S. Pat. No. 10,855,714B2 discloses systems and methods for determining a sequence and types of communications for a simulated phishing campaign based on applying artificial intelligence to at least the results from a plurality of simulated phishing campaigns.

SUMMARY

The present invention provided an improved method of automatically generating the content simulated phishing communications. The method allows personalised phishing communications to be generated and sent to users within an organization with minimal input from an administrator.

Previous methods to generating phishing communications rely on using predetermined static text as the content of a phishing communication. In previous methods, the content and format of each communication is manually designed, and therefore the generation of various styles of communication is laborious. Furthermore, the previous methods have limited adaptability and flexibility as they are limited to using the predetermined static text. Due to the requirement to generate the predetermined static text, the previous methods are limited in the number of types of phishing communications that can be issued.

By contrast, embodiments described herein rely on a generative artificial intelligence algorithm to generate the content of a phishing communication, which allows the form and content a phishing communication to be easily adapted based on the input. The content of the phishing communication is generated based on data associated with the recipient user, which allows realistic and personalised simulated phishing communications to be sent. In particular, certain embodiments described herein provide for the prompt of the generative artificial intelligence algorithm to be easily modified based on the selection from a plurality of templates corresponding to various parameters which can be filled with data associated with the user. The templates can be automatically selected based on historical data associated with a user, which enables relevant phishing communications that are tailored to the training requirements of the user. The systems and methods described herein therefore allow for a comprehensive phishing campaign and can therefore be created with reduced administrative burden.

According to a first aspect there is provided a method for generating a simulated phishing campaign. The method comprises selecting one or more users from a plurality of users, and accessing, from a database, data associated with each of the one or more users. The method further comprises generating, with a generative artificial intelligence algorithm, the content of a phishing communication for each of the one or more users based on the data associated with the respective user.

In an embodiment, the content of the phishing communication for each respective user is generated by inputting a prompt into the generative artificial intelligence algorithm, wherein the prompt is based on the data associated with the respective user.

In an embodiment, the prompt is based on a template comprising empty elements, wherein the prompt comprises the template with the empty elements filled based on the data associated with the respective user.

In an embodiment, the template is selected from a plurality of templates, each of the one or more templates corresponding to a respective social engineering technique of a plurality of social engineering techniques and/or a respective message type of a plurality of message types.

In an embodiment, the template is selected based on one or more social engineering techniques and/or one or more message types determined by an administrator and/or an algorithm, and optionally further based on historical user data from previous phishing campaigns.

In an embodiment, the template is selected based on a random sampling of the plurality of templates.

In an embodiment, a respective template is selected for each user of the one or more users.

In an embodiment, the random sampling is a weighted random sampling, wherein the weighting is based upon historical data of previous templates selected for said user.

In an embodiment, the prompt is modified based on a difficulty level selected from a plurality of difficulty levels.

In an embodiment, the generative artificial intelligence algorithm is an algorithm trained to generate text-based content in response to a prompt.

In an embodiment, the data associated with each of the one or more users comprises personal data.

In an embodiment, the data associated with each respective user comprises a plurality of associates. The method further comprises selecting an associate from the plurality of associates; and determining, based on a lookup table, one or more features associated with said user and said selected associate; wherein the content of the phishing communication is further based upon the selected associate and the one or more features.

In an embodiment, each of the plurality of associates is associated with a collaboration score based upon historical interactions with the respective user, wherein the associate is selected based upon a weighted random sampling of the plurality of associates, and wherein the weighting is based upon the collaboration score.

In an embodiment, the method further comprises sending, to each respective user, a phishing communication comprising the content generated for that user.

In an embodiment, the timing of sending each respective phishing communication is based on predefined frequency.

In an embodiment, the timing of sending each respective phishing communication is further based on a random time offset.

In an embodiment, the method further comprises: tracking a response of each respective user to the received phishing communication; and storing the response or each respective user in the database.

In an embodiment, the method further comprises performing an automated testing of the content of the phishing communication generated for each respective user to check for errors.

In an embodiment, the data associated with each user of the one or more users comprises at least one of demographic data, consumer data, interaction data, calendar data, incoming email data, survey data, and previous phishing campaign responses.

According to a second aspect there is provided a system for generating a simulated phishing campaign. The system comprises a memory storing a database comprising data associated with a plurality of users; and a processing circuitry. The processing circuitry is configured to access data associated with one or more users of the plurality of users; and generate with an with a generative artificial intelligence algorithm, the content of a phishing communication for each of the one or more users based on the data associated with the respective user.

In an embodiment, the content of the phishing communication for each respective user is generated by inputting a prompt into the generative artificial intelligence algorithm, wherein the prompt is based on the data associated with the respective user.

In an embodiment, the prompt is based on a template stored in the database comprising empty elements, and wherein the prompt comprises the template with the empty elements filled based on the data associated with the respective user.

In an embodiment, the template is selected from a plurality of templates, each of the plurality of templates corresponding to a respective social engineering technique of a plurality of engineering techniques and/or a respective message type of a plurality of message types.

In an embodiment, the wherein the template is selected based on one or more social engineering techniques and/or one or more message types determined by an administrator and/or an algorithm, and optionally based on historical user data from previous phishing campaigns.

In an embodiment, the template is selected based on a random sampling of the plurality of templates.

In an embodiment, a respective template is selected for each user of the one or more users.

In an embodiment, the random sampling is a weighted random sampling, wherein the weighting is based upon historical data of previous templates selected for said user.

In an embodiment, the prompt is modified based on a difficulty level selected from a plurality of difficulty levels.

In an embodiment, the generative artificial intelligence algorithm is an algorithm trained to generate text-based content in response to a prompt.

In an embodiment, the data associated with each of the one or more users comprises personal data.

In an embodiment, the data associated with each respective user comprises a plurality of associates. The processing circuitry is further configured to: select an associate from the plurality of associates; determine, based on a lookup table stored in the database, one or more features associated with said user and said selected associate; wherein the content of the phishing communication is further based upon the selected associate and the one or more features.

In an embodiment, each of the plurality of associates is associated with a collaboration score based upon historical interactions with the respective user, wherein the associate is selected based upon a weighted random sampling of the plurality of associates, and wherein the weighting is based upon the collaboration score.

In an embodiment, wherein the processing circuitry is further configured to send, to each respective user, a phishing communication comprising the content generated for that user.

In an embodiment, the each respective phishing communication is sent based on predefined frequency.

In an embodiment, the timing of sending each respective phishing communication is further based on a random time offset.

In an embodiment, the processing circuitry is further configured to track a response of each respective user to the received phishing communication; and store the response or each respective user in the database.

In an embodiment, the processing circuitry is further configured to perform an automated testing of the content of the phishing communication generated for each respective user to check for errors.

In an embodiment, the data associated with each user of the one or more users comprises at least one of demographic data, consumer data, interaction data, calendar data, incoming email data, survey data, and previous phishing campaign responses.

BRIEF DESCRIPTION OF FIGURES

Arrangements of the present invention will be understood and appreciated more fully from the following detailed description, made by way of example only and taken in conjunction with drawings in which:

FIG. 7 shows an empty template suitable for use as a prompt for a generative artificial intelligence algorithm in accordance embodiments described herein; and FIG. 8 shows the template of FIG. 7 filled with user associated data in accordance embodiments described herein.

DETAILED DESCRIPTION

A simulated phishing campaign can be conducted within an organization to train the members of the organization to be more resilient to the threats faced by malicious actors. As part of the campaign, simulated communications are sent to users within an organization mimicking a typical communication that would be sent by a malicious actor. The communication can allegedly be sent by a contact of the user. The content of a communication can be based on a social engineering technique. The communication can be written in a manner that is more or less realistic. The response of a user to a communication is then recorded.

Embodiments described herein relate to the automatic generation of the content of a phishing communication by using a generative artificial intelligence algorithm. In particular, certain embodiments generate the content by prompting the generative artificial intelligence algorithm with a template that is adapted based on the user data and optional parameters. In further embodiments, the communication is sent according to a desired frequency and the response of the user is stored in a database. The embodiments described herein therefore allow for user-specific communications to be automatically generated. Since the content is generated using a generative artificial intelligence algorithm, a variety of phishing communications can be produced with minimal input from an administrator.

Figure 1:
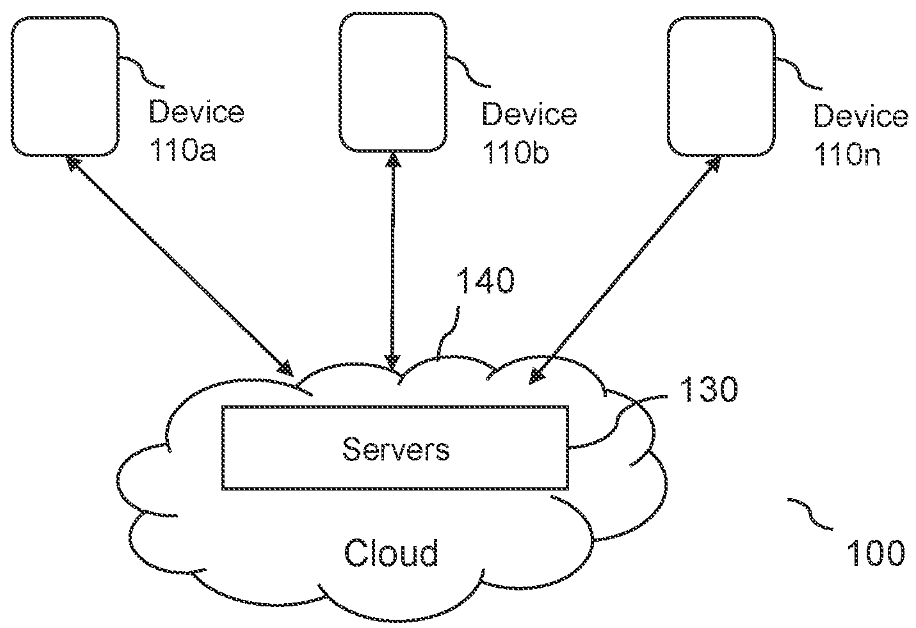
FIG. 1 shows a network environment comprising servers and devices suitable for implementing embodiments described herein.

A phishing campaign can be conducted within an organization by connecting the devices of the users and the administrator within the organization to a server 130 over a network environment 100. FIG. 1 illustrates a network environment 100 comprising a plurality of devices 110*a*-110*n* each connected to one or more servers 130 via a network 140.

The network 140 is any type of wired or wireless network suitable for allowing communication between each of the plurality of devices 110*a*-110*n* and the one or more servers 130. The one or more servers 130 each comprise phishing communication software and a database. In the present embodiment, the network environment 100 is a cloud computing environment and the server 130 is connected to the one or more devices 110*a*-110*n* via a cloud network 140. The one or more servers 130 can each be situated geographically remotely to each of the one or more devices 110*a*-110*n*. Each of the one or more servers 130 host cloud services including applications and/or databases that can be accessed by the one or more clients 110*a*-110*n*. Cloud services may be deployed privately, publicly, or a combination of the two (hybrid). Software and database services may be distributed as a Software as a Service (SaaS) model.

Figure 2:
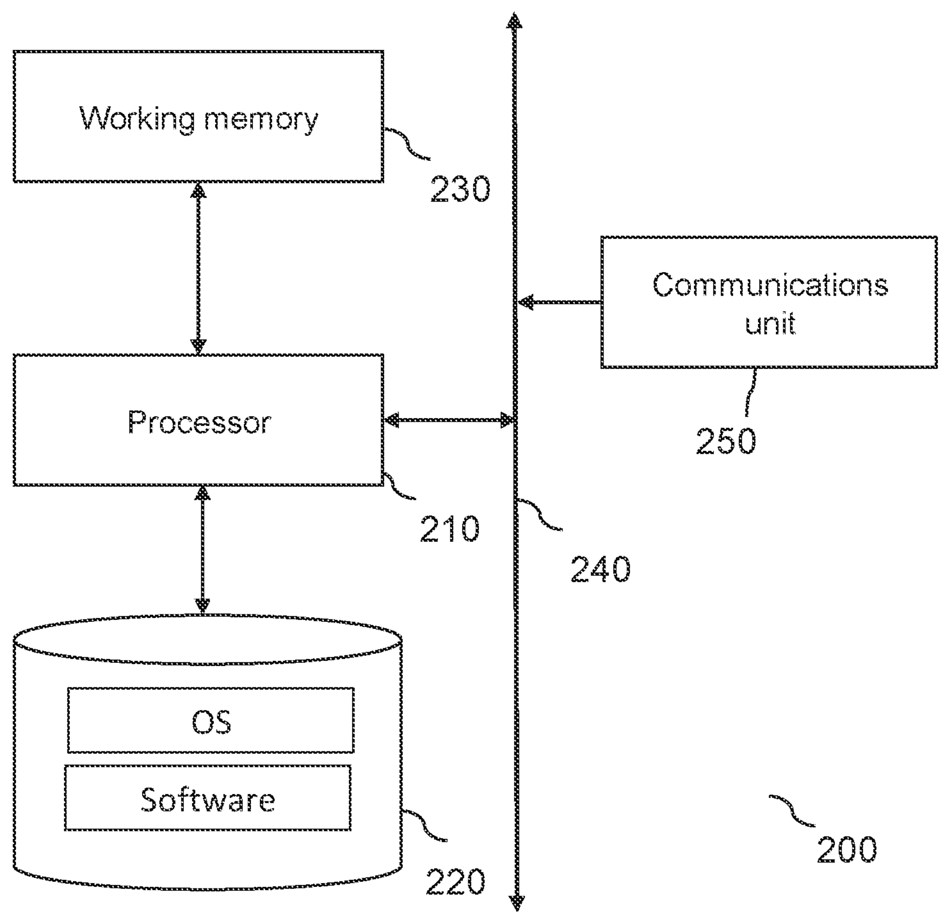
FIG. 2 shows a computer system suitable for implementing embodiments described herein.

Each of the devices 110*a*-110*n* and one or more servers 130 may be implemented as any suitable type of computing system suitable for communicating use in network environment 100 and performing the embodiments described herein. FIG. 2 illustrates an example computing system 200 comprising a processor 210 coupled to a mass storage unit 234 and accessing a working memory 230. Usual procedures for the loading of software into memory and the storage of data in the mass storage unit 220 apply. The processor 210 also accesses, via bus 240, a communications interface 250 that is configured to receive data from and output data to an external system (e.g. an external network or a user input or output device). The communications interface 250 may be a single component or may be divided into a separate input interface and a separate output interface.

The processor is configured to implement the methodology described herein based on executable software stored within the mass storage unit 220. The software can be embedded in original equipment, or can be provided, as a whole or in part, after manufacture. For instance, the software can be introduced, as a whole, as a computer program product, which may be in the form of a download, or to be introduced via a computer program storage medium, such as an optical disk or connectable memory drive (such as a Universal Serial Bus flash drive). Alternatively, modifications to an existing controller can be made by an update, or plug-in, to provide features of the above described embodiment.

Figure 3:
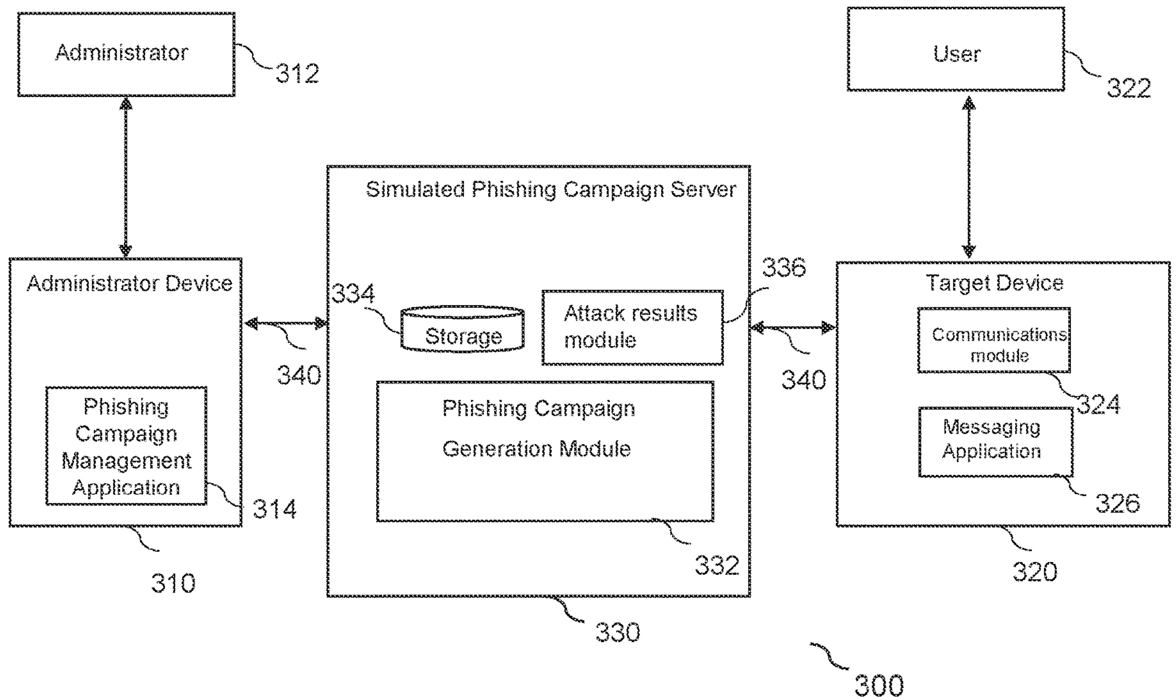
FIG. 3 shows a network environment comprising an administrator device, target device and simulated phishing campaign server suitable for implementing embodiments described herein.

FIG. 3 is a schematic of a system architecture 300 for generating the content of a phishing communication as part of a simulated phishing campaign. The system 300 comprises an administrator device 310, at least one target device 320, and a simulated phishing campaign server 330. A network 340 connects the simulated phishing campaign server 330 to the administrator device 310 and to each of the at least one target device 320 to allow communication between the devices 310, 320 and the simulated phishing campaign server 330. The administrator device 310 is operated by an administrator 312, who may be a security manager at an organization, a third party security consultant, or any other party. In some embodiments, the administrator 312 may be assisted by a computer program. In other embodiments, the administrator 312 may be a computer program suitable for performing administrative decisions. For instance, the administrator 312 may be or may make use of a machine learning model configured to generate recommended actions for managing the phishing campaign (e.g. inputs to the phishing campaign management application 314). This machine learning model may be implemented on the administrator device 310. Each of the at least one target device 320 is operated by a respective user 322 within the organization. The devices 310, 320 may be desktop computer, laptop, tablet, mobile device and can be implemented as computer system 200. The simulated phishing campaign server 330 can be a server 120 hosted on the cloud 140 and implemented as computer system 200 or any other type of system suitable for use as a server.

The administrator device 310 comprises a phishing campaign management application 314 for instructing the simulated phishing campaign server 330 to generate the content of a phishing communication and send the communication as part of a simulated phishing campaign. The administrator device 310 further comprises a display such as screen to allow the administrator 312 to interact with the phishing campaign management application 314 via a user input device such as a mouse and/or keyboard. The phishing campaign management application 314 is configured to allow an administrator 312 to select one or more users from a plurality of users and communicate the list of selected one or more users to the simulated phishing campaign server 330.

The simulated phishing campaign server 330 comprises a phishing campaign generation module 332 and storage 334 (e.g. a database) for storing data associated with a plurality of users within one or more organizations. The phishing campaign generation module 332 is configured to receive the list of selected one or more users from the administrator device 314 and access data associated with each of the one or more users from the storage 334. The phishing campaign generation module 332 is further configured to generate, with a generative artificial intelligence algorithm, the content of a phishing communication for each of the one or more users based on the data associated with the respective user. In some embodiments, the phishing campaign generation module 332 is configured to send the communication to each respective user 322. In further embodiments, the simulated phishing campaign server 330 comprises an attack results module 336 configured to track a response of each respective user to the received phishing communication and store the response or each respective user in the storage 334. The storage 334 can be part of a mass storage such as mass storage 220.

The target device 320 comprises a communications module 324 for facilitating communication between the target device 320 and the simulated phishing campaign server 330. The target device 320 further comprises one or more messaging applications 326 suitable for receiving, viewing and responding to messages. The target device 320 further comprises a display such as a screen to allow a user 322 to view a message received through the one or more messaging application 326 via a user input device such as a mouse and/or keyboard.

Figure 4:
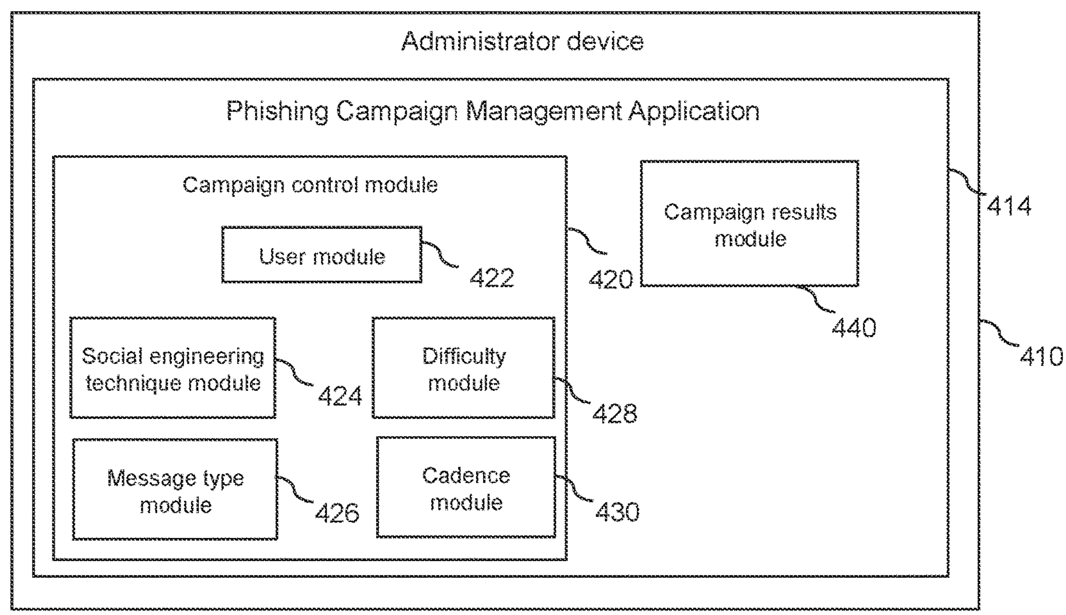
FIG. 4 shows an administrator device suitable for use in the network environment of FIG. 3.

Various features of the administrator device 310 will now be described in further detail with reference to FIG. 4, which shows an administrator device 410 in accordance with administrator device 310. The administrator device 410 comprises a phishing campaign management application 414 in accordance with the phishing campaign management application 314 of FIG. 3. Further features of the administrator device 310 described in relation to the embodiment of FIG. 3 are also included in the present embodiment, but are not mentioned for brevity.

The phishing campaign management application 414 comprises a campaign control module 420 configured to enable an administrator 312 to initiate and terminate a phishing campaign and a campaign results module 440 to enable an administrator 312 to review the results of a campaign.

The campaign control module 420 comprises a user module 422 configured to enable the selection of one or more users from a plurality of users within an organization. The plurality of users correspond to the plurality of users stored on the simulated phishing campaign server 330. The selected plurality of users become targets of a simulated phishing campaign and can be scheduled to receive a respective phishing communication generated by the simulated phishing campaign server 330. In some embodiments, the campaign control model 420 further comprises one or more of modules 424-430 which are configured to enable an administrator 312 to determine the form, content and scheduling of the phishing communications by selecting parameters from predetermined lists. The predetermined lists correspond to predetermined lists stored on the storage 334 of the simulated phishing campaign server 330. The social engineering technique module 424 is configured to enable the selection of one or more social engineering techniques from a plurality of social engineering techniques. The message type module 426 is configured to enable the selection of one or more message types from a plurality of message types. The difficulty module 428 is configured to enable the selection of one or more difficulty levels from a plurality of difficulty levels. The cadence module 430 is configured to enable the setting of a message frequency, or message cadence with which a phishing communication is sent to each of the selected users. These parameters will be described in further detail below with reference the database 534.

Each of the user module 422, social engineering technique module 424, message type module 426, difficulty module 428 and campaign results module 440 may be updated based on the information provided in storage 334 so that the phishing campaign management application 414 displays up-to-date user data, predetermined lists, and campaign results.

The campaign control module 420 is configured to instruct the simulated phishing campaign server 330 to generate one or more phishing communications based on the users selected through user module 422 and optionally based on the parameters selected through modules 422-430. It should be appreciated that a campaign control module 420 is configured to instruct the simulated phishing campaign server 330 to conduct a campaign even when none of the parameters are selected from one or more of modules 424-430. In such cases, the campaign control module 420 is configured to instruct the simulated phishing campaign server 330 to generate a phishing communication for selected one or more users based on all available parameters. In embodiments where no parameters are selected from one or more of modules 424-430, the campaign control module 420 is configured to instruct the simulated phishing campaign server 330 to conduct a campaign based on all of the parameters that are available for selection in that module, i.e., all of the levels or techniques in that module are permissible. For example, if none of the social engineering techniques from the plurality of social engineering techniques are selected by an administrator 312, the campaign control module 420 is configured to instruct the simulated phishing campaign server 330 to conduct a campaign based on all of the plurality of social engineering techniques.

The campaign results module 440 comprises a dashboard showing the results of present and past phishing campaigns. The campaign results module 440 can access the storage 334 of the simulated phishing campaign server 330 in order to access user data and the results of present and past phishing campaigns. Based on this data, the campaign results module 440 is configured to provide statistics and metrics in relation to the performance of one or more users on the dashboard. The dashboard is configured to indicate types, formats and frequencies of phishing communications sent to users within an organization, as well as indications as to which users require further training.

Figure 5:
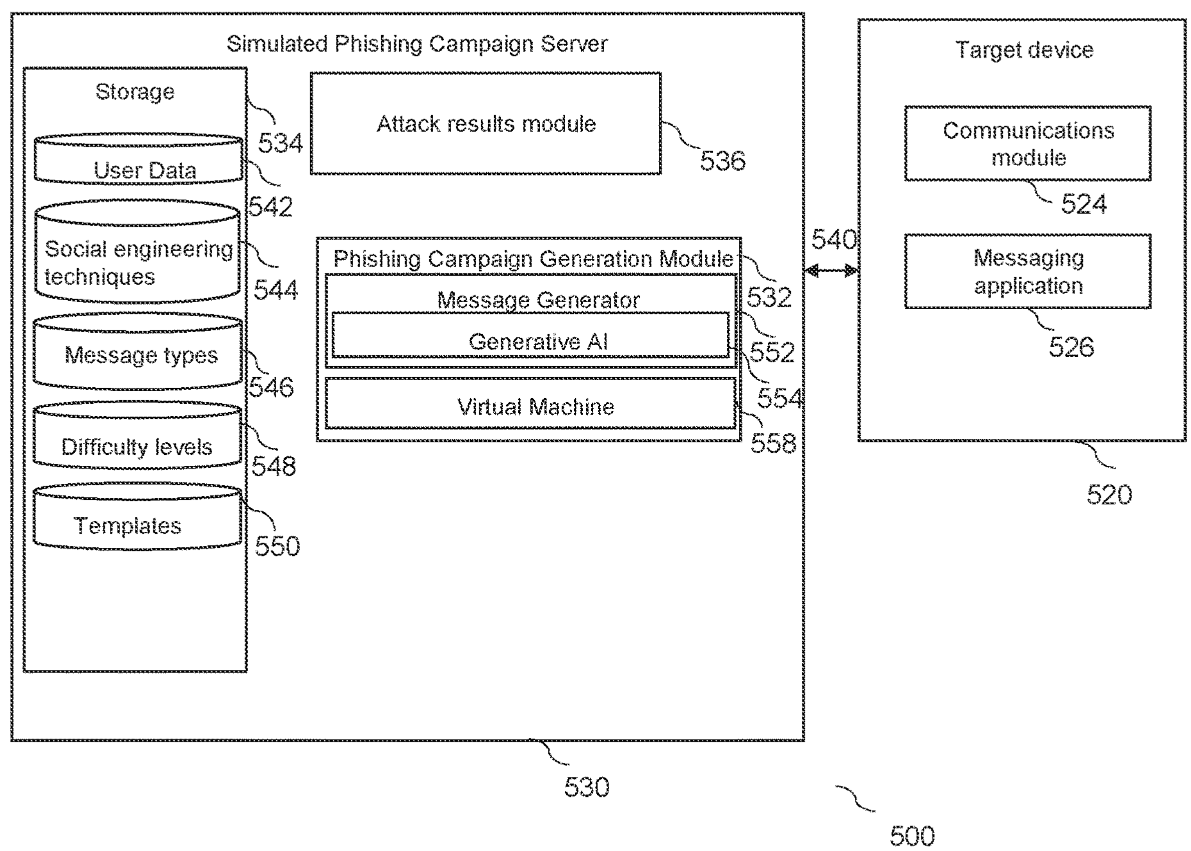
FIG. 5 shows a simulated phishing campaign server suitable for use in the network environment of FIG. 3.

Various features of the simulated phishing campaign server and target device will now be described in further detail with reference to FIG. 5, which shows an arrangement 500 of a simulated phishing campaign server 530 and a target device 520 in accordance with the simulated phishing campaign sever 330 and target device 320 of FIG. 3. The simulated phishing campaign server 530 and the target device 520 are connected over a network 540, which can be network 340. The phishing campaign server 530 comprises a phishing campaign generation module 532, a storage 534, and attack results module 536 in accordance with phishing campaign generation module 332, storage 334 and attack results module 336 of FIG. 3 respectively. Further features described in relation to the embodiment of FIG. 3 are also included in the present embodiment, but are not mentioned for brevity.

The storage 534 comprises user data 542 comprising the names of users within an organization and optional further data related to each of the respective users. The user data 542 can further comprise basic personal data, which can comprise demographic and/or employment related data about a user. The personal data can comprise one or more of: name, email, department, job role, location, level of access to sensitive information, access to cloud computing resources, and home working frequency.

The aforementioned personal data is relatively static in that it changes infrequently over the time period that a user is a member of an organization. The user data 542 can further comprise comparatively dynamic data based on the interactions of a user with associates. An associate can be a member of the organization to which the user belongs or may be someone from outside the organization to which the user belongs, such as a colleague, co-worker and/or collaborator. An associate may be a person that the user may interact with (e.g. that a user has historically interacted with). The user data 542 can comprise data relating to a user's associates and a collaboration score for each respective pair of associates based on their level of collaboration, which will be described in further detail below. The user data 542 can further comprise one or more of any of the following: data relating to one or more of frequency and/or recipients of emails, frequency and/or recipients of instant messages, co-membership of file-sharing groups (e.g., Google Drive, Sharepoint), and co-attendance at meetings, data on the user's incoming emails comprising one or more of sender address and sender category, email topic, and engagement of the user with emails (email fatigue), data relating to the information created by a user as part of their daily activities over the network 540, also known as the "digital exhaust" comprising one or more of details of the device they are using, login locations, login success/failure e.g., via 2-factor authentication and security patch status of devices used, and data from a user's calendar such as one or more of usual working hours, time zone, out of office details, and travel details.

The user data 542 can further comprise data relating to the result of cyber security training, such as results from surveys a user has completed, self-reported habits and/or activities of the user, and data on engagement with cyber security training including a completion rate of training and demonstrated knowledge.

The user data 542 can further comprise historical data relating to previous phishing communications sent to a user, such as the time stamps of previous phishing communications and the social engineering techniques, difficulty level and/or message types associated with each of the previous phishing communications. The user data 540 can further comprise data corresponding the response of a user to previous phishing communications received, such as one or more of the read rate of phishing communications, the click through rate of phishing communications received by the user, and a credentials send rate in response to phishing communications received by the user.

The simulated phishing campaign server 530 is configured to continually update user data 542 based on information contained in the attack results module 536 and information received from the target devices 520 and/or administrator device 310. For example, statistics relating to the response of a user to previous phishing communications can stored in the attack results module 536 and this information can be periodically communicated to the simulation phishing campaign server 530. In addition, any changes relating to personal details of a user, such as their name, job role or department, can be updated based on information received from the target device of the user 520 and/or the administrator device 310.

The database 534 can further comprise a plurality of social engineering techniques 544 which can be stored as a list. Each of the plurality of social engineering techniques 544 may be associated with a difficulty level. In some embodiments, the plurality of social engineering techniques 544 can correspond to one or more of authoritative request, close associate collaboration, known brand, business-as-usual (BAU) insertion, desire outcome and desire for gossip. In other embodiments, any other suitable range of social engineering techniques may be used. Authoritative request refers to a message asking a user to do something which can originate from a senior member of an organization such as a line manager of a target user. Close associate collaboration refers to a message purporting to be from a close associate, asking for some plausible collaboration on behalf of the targeted user. Known brand refers to a message purporting to be from a company that the target user has previously received communications from. BAU insertion refers to a message disguised as a regular prompt from a SaaS tool used by the employee that they are used to seeing in their business-as-usual activities. Desired outcome refers to a message that purports to relate to an outcome that a target user would like to achieve as part of their day-today activities, for example a message to a sales executive purporting to be from a prospective client. Desire for gossip refers to a message that may interest a target user because it purports to relate to someone they know, for example, a message purporting to be from LinkedIn informing the user that a close associate of theirs is actively looking for a new job.

The database 534 can further comprise a plurality of message types 546, which can be stored as a list. The plurality of message types 538 can comprise one or more of email, at least one instant message such as Microsoft teams or Slack, and text message.

The database 534 can further comprise a plurality of difficulty levels 548 and associated prompt modifications and social engineering techniques, which can be stored as a table. The plurality of difficulty levels 548 can comprise one or more of easy, medium, and hard. Easy can refer to a message which includes significant bad formatting and poor spelling and grammar and/or where only the most obvious social engineering techniques are used. Medium can refer to message where a small number of spelling and grammatical errors persist and/or a mixture of easy and difficult social engineering techniques are employed. Hard can refer to a message with correct spelling and grammar and realistic formatting and/or the use of the most difficult social engineering techniques. Accordingly, as the difficulty increases, the number of errors decreases, and the difficulty of the social engineering techniques used increases.

The database 534 can further comprise a plurality of templates 550 which can be stored in any format suitable for storing text. Each of the plurality of templates 550 provide a skeleton of a prompt suitable for input into a generative artificial intelligence algorithm. Each of the plurality of templates comprise empty elements which can be filled based on the user data 542. Each of the plurality of templates 542 correspond to a respective social engineering technique of the plurality of social engineering techniques 544 and/or a respective message type of the plurality of message types 546. For example, the content and style of each of the plurality of templates 550 can correspond to the respective social engineering technique and/or message type with which the template is associated.

The phishing campaign generation module 532 will now be described in further detail. The phishing campaign generation module 532 is configured to receive instructions from the campaign control module 420 of the administrator device 414 to perform a phishing campaign. The phishing campaign generation module 532 is configured to select one or more users from the plurality of users in accordance with the users selected by the administrator 312 and generate a phishing communication for each of the respective users based on data associated with the users stored in database 534.

In further embodiments, the phishing campaign generation module 532 is configured to only select each of the one or more users if the time since a last communication was sent to the respective user is above a threshold based on a message frequency. The message frequency can be determined by the administrator 312. The phishing campaign generation module 532 is configured to determine the last time a communication was sent to a user based on the historical data of previous phishing communications stored in user data 542.

The phishing campaign generation module 532 comprises a message generator 552 configured to instruct a generative artificial intelligence algorithm 554 to generate the content of the phishing communication. The generative artificial intelligence algorithm 554 can be any artificial intelligence algorithm suitable for providing a text-based output based on a prompt, such as a large language model (LLM) trained on large amounts of text data. In some embodiments, the LLM is any general purpose LLM trained for completion tasks such as ChatGPT-3 or -4 (OpenAI), Llama2 (Meta), or Falcon LLM. A completion task may be a task of predicting a set of words given a particular context (e.g. prompt), such as, predicting words that should immediately follow an input prompt. In some embodiments, the generative artificial intelligence algorithm 554 is configured to take a prompt, which can be a text-based prompt, as input, and provide the content of a phishing communication as output. In some embodiments, the prompt is based on a template of the plurality of templates 550. In some embodiments, each of the plurality of templates 550 contain empty elements and the message generator 552 is configured to fill the empty elements of a template based on the data associated with said user stored in the user data 542.

The present embodiment shows the generative AI 552 being stored and implemented by the simulated phishing campaign server 530. Advantageously, the user data 542 does not need to leave the simulated phishing campaign server 530 in order for the phishing communication to be generated. This can help to maintain the security of the user data. In alternative embodiments, an external device (e.g. an external server) may store and implement the generative AI 552. In this case, the message generator 552 may generate the prompt and provide the prompt to the generative AI 552 on the external device. The generative AI 552 may then use the prompt to generate the message, and provide the message to the simulated phishing campaign server 530 for use in the simulated phishing campaign.

In some embodiments, the message generator 552 is configured to select a template from the plurality of templates 550. The selection can be based on a random sampling of the plurality of templates 550. Each of the plurality of templates 550 can be associated with one or more parameters comprising a respective social engineering technique of the plurality of social engineering techniques 544 and/or a respective message type of a plurality of message types 546. The association between each template and its respective parameters can be stored as a lookup table in the database 534. In some embodiments, the message generator 552 is configured to select a template from the plurality of templates 550 based on a random sampling of the one or more social engineering techniques and/or one or more message types selected by the administrator 312. In further embodiments, if one or a plurality of difficulty levels are selected by the administrator 312, the message generator 552 is configured to select the difficulty level, or perform a random sampling of the plurality of difficulty levels to select a difficulty level, and conduct the random sampling of the templates based on the subset of the one or more social engineering techniques and/or one or more message types that correspond to the selected difficulty level.

The message generator 552 is configured to select a template from the plurality of templates 550 based on the selected social engineering technique and/or message type. The template can be selected using a lookup table defining the respective social engineering technique and message type associated with each template. In some embodiments, the message generator 552 is configured to perform a template selection for each of the selected users.

In some embodiments, the random sampling is a weighted random sampling based on historical data relating to previous communications sent to a user. The message generator 552 is configured to access historical data stored in user data 542 and determine the social engineering techniques and/or message types and/or difficulty levels used in previous phishing communications sent to a user. When performing a random sampling, the message generator 552 is configured to assign relatively lower probabilities of selection to the social engineering techniques and/or message types and/or difficulty levels used in recent phishing communications sent to a user.

In some embodiments, message generator 552 is configured to modify the prompt based on a difficulty level. If the administrator 312 selects a single difficulty level, the message generator selects that difficulty level. If a plurality of difficulty levels are selected by the administrator 312 and a sampling of difficulty levels has not already been performed during template selection, the message generator 552 is configured to select one of the plurality of difficulty levels based on a random sampling. Based on the level of difficulty, a prompt can be modified to introduce mistakes in the text or formatting. For example, easier levels can correspond to more deliberate or obvious mistakes in the message body and formatting.

In some embodiments, the message generator 552 is configured to base the content of the phishing communication for a respective user on information relating to an associate of the users based on the user data 542. The user data 542 can comprise a list of associates for each respective user and the message generator 552 can be configured to select one of the associates and determine from the database one or more features associated with the associate and one or more features associated with both the user and the associate. The one or more features associated with both the user and the associate can be computed tasks and/or sharing objects that correspond to the roles and/or activities that the user and associate perform within an organization. For example, a user and associate that both work in sales may share potential customer details, while a user and associate that both work as engineers may share code pull requests.

In some embodiments, the message generator 552 is be configured to select an associate based on a random sampling of the associates of a user. In further embodiments, the selection of an associate is based on a collaboration score and weighted sampling such as an exponentially weighted random sampling. The user data 542 can comprise a respective collaboration score for a user and each of their associates. The collaboration score can be based on a weighted sum on one or more of the number of emails and/or instant messages that they have exchanged, the number of meetings they co-attend and the number of file-sharing groups they both belong to. The message generator 552 can select an associate using a random sampling based on the collaboration score, wherein associates with a higher collaboration score have a higher probability of being selected. Closest associates are therefore most likely to be selected but there is some randomness in the process. The message generator 552 can be further configured to fill one or more of the empty fields of a selected template based on the one or more features associated with the selected associate and the one or more features associated with both the user and the selected associate.

In some embodiments, the phishing campaign generation module 530 further comprises a virtual machine 558 configured to send a phishing communication. The virtual machine 558 may run one or more instant messaging applications such as Microsoft teams or Slack and/or run software configured to send email and/or text message. In other embodiments, a virtual machine 558 may not be used and the operating system of the server 530 can be configured to send a phishing communication. In some embodiments, the phishing campaign generation module 530 is configured to save the details of a sent communication to a respective user, such as the content, social engineering technique used, message type and difficulty level, and the timing of its deployment, in user data 542.

In some embodiments, the phishing campaign generation module 532 is configured to send a phishing communication to a respective user based on a predefined frequency. The predefined frequency can correspond to the message cadence defined in the cadence module 430 of the administrator device 410. In some embodiments, the phishing campaign generation module 532 is configured to access the time stamps of previous phishing communications sent to a user and schedule a new phishing communication to be sent to a user in accordance with the predefined frequency. In further embodiments, a phishing communication is scheduled to be sent according to a random time offset so that users within an organization do not all receive a phishing communication during the same time period.

In some embodiments, the message generator 552 performs an automated testing of the content of the phishing communication generated for each respective user to check for errors before the phishing communication is sent. The automated testing can comprise one or more of spelling and grammar checks, word count, word frequency, named entity recognition, and the testing of any URLs (Uniform Resource Locators) contained in the phishing communication.

The attack results module 536 is configured to track the response of a user 322 to a phishing communication once it has been received by the user. Each phishing communication is assigned a unique document URL which is contained within the communication. This allows the attack response module 536 to detect when the targeted user clicks on the URL in the communication. For phishing communications comprising a credential capture simulation, a login type form can be presented on the webpage accessed by the user once they click on the URL. If the user supplies their credentials, the attack results module 536 can record that the user has supplied credentials. This can be achieved without the attack results module 536 recording the actual credentials entered. A user 322 may respond by ignoring a communication, reading the communication, clicking on any links provided in the communication, reporting the communication as suspicious, replying to the communication and/or providing credentials to the sender. The attack response module 536 is configured to save the details relating to the response of a user in user data 542

Figure 6:
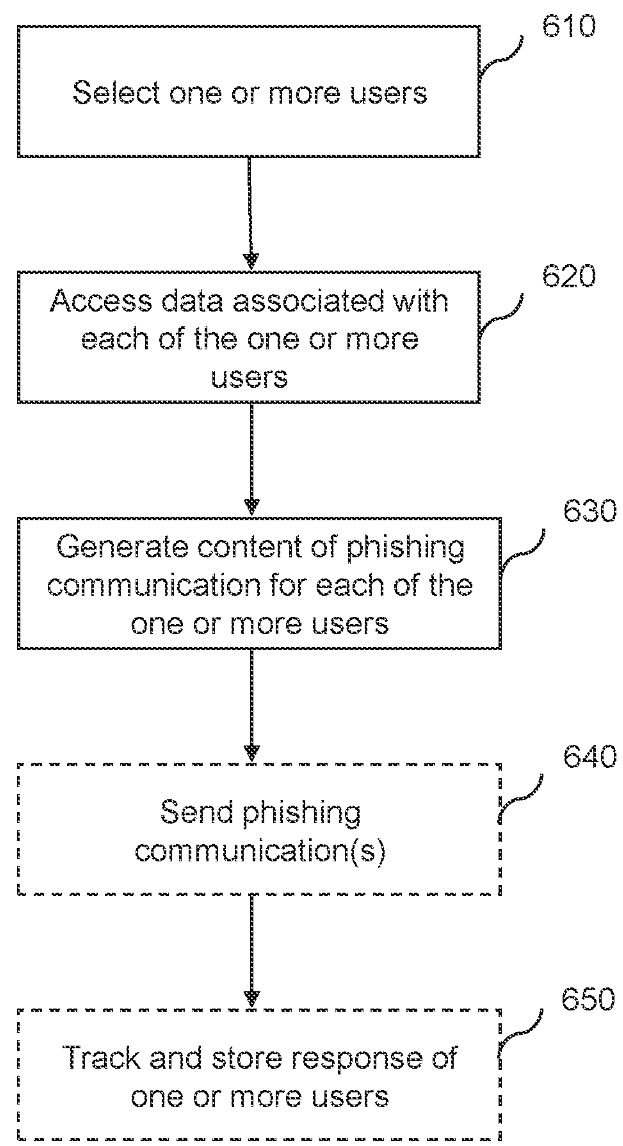
FIG. 6 shows a method for generating the content of a phishing communication.

The target device 520 comprises a messaging application 526 for receiving a phishing communication sent by the simulated phishing campaign server 330. The messaging application 526 can include one or more instant messaging applications such as Microsoft teams or Slack and/or be software suitable for receiving email and/or text message. The target device 520 further comprises a communication module 524 configured to send and receive communications over a wired or wireless network. The communication module 524 may be, or include, a wireless network card and/or driver. With reference to FIG. 6, a method 600 of generating a simulated phishing campaign will now be described. The method 600 can be performed by the simulated phishing campaign server 530 previously described.

At stage 610, the phishing campaign generation module 532 selects one or more users from a plurality of users. In some embodiments, the phishing campaign generation module 532 selects the one or more users based on instructions received from the administrator device 410. The instructions can comprise one or more users selected by the administrator 312 using the user module 422 of the campaign control module 420.

In some embodiments, the instructions further comprise one or more social engineering techniques from a plurality of social engineering techniques, one or more message types from a plurality of message types, one or more difficulty levels from a plurality of difficulty levels and/or a message frequency. In further embodiments, the phishing campaign generation module 532 only selects each of the one or more users if the time since a last communication was sent to the respective user is above a threshold which is calculated based on the message frequency.

In some embodiments, the phishing campaign generation module 532 selects one or more templates from a plurality of templates 550. A template may be selected for each of the respective one or more users. In some embodiments, each of the plurality of templates is associated with one or more parameters comprising a social engineering technique of a plurality of social engineering techniques and/or a message type of a plurality of message types. In some embodiments, the message generator 552 selects a template from the plurality of templates 550 based on the one or more social engineering techniques and/or one or more message types contained in the instructions sent by the administrator 312. The phishing campaign generation module 532 can select a template by first performing a random sampling of the one or more social engineering techniques and/or one or more message types contained in the instructions sent by the administrator 312 to select a social engineering technique and/or message type. The phishing campaign generation module 532 then selects a template corresponding to the selected social engineering technique and/or message type. In some embodiments, the sampling is a weighted random sampling as previously described.

In further embodiments, if the instructions sent by the administrator 312 comprise one or a plurality of difficulty levels, the phishing campaign generation module 532 selects the one difficulty level, or performs a random sampling of the plurality of difficulty levels to select a difficulty level. The phishing campaign generation module 532 performs the random sampling of the templates based on the subset of the one or more social engineering techniques and/or one or more message types that correspond to the selected difficulty level.

At stage 620, the phishing campaign generation module 532 accesses data associated with each of the one or more users stored in database 534. In some embodiments, the data is accessed based on the template selected by the message generator 552 for a respective user. The phishing campaign generation module 532 can access information in the user data 542 according to the empty fields of the template and fills the empty fields with the accessed information.

In some embodiments, the message generator 552 bases the content of the phishing communication for a respective user on information relating to an associate of a respective user. The message generator 552 can select an associate based on a random sampling of the associates associated with a respective user. The message generator 552 selects an associate of a respective user and determines one or more features associated with said user and one or more features associated with both the user and selected associate. The selection can be based on a random sampling. The message generator 552 fills one or more of the empty fields of a selected template based on the one or more features associated with said user and one or more features associated with both the user and selected associate. In further embodiments, the selection of an associate is based on collaboration scores and a weighted random sampling as previously described.

At stage 630, the phishing campaign generation module 532 generates, with a generative artificial intelligence algorithm 554, the content of a phishing communication for each of the one or more users based on the data associated with the respective user. In some embodiments, the message generator 552 generates the content based on inputting a prompt into the generative artificial intelligence algorithm 554. The prompt can be based on the data associated with the respective user. In some embodiments, prompt is based on the template selected by the phishing campaign generation module 532 for the respective user. In further embodiments, the message generator 552 modifies the prompt based on a difficulty level. If the instructions sent by the administrator device comprise a plurality of difficulty levels, the message generator 552 performs a random sampling of the difficulty levels and selects one of them if this has not already been performed at stage 620.

In some embodiments, the phishing campaign generation module 532 performs an automated testing of the content of the phishing communication generated for each respective user to check for errors.

In further embodiments, at stage 640, the phishing campaign generation module 532 sends a phishing communication to each selected user based on the content generated by the generative artificial intelligence algorithm 554. In some embodiments, a phishing communication is sent to a respective user based on a predefined frequency. The predefined frequency can correspond to a message cadence defined in the instructions sent to the simulated phishing campaign server 530. In some embodiments, the phishing campaign generation module 532 accesses the time stamps of previous phishing communications sent to a user and schedules a new phishing communication to be sent to a user in accordance with the predefined frequency. In further embodiments, the phishing campaign generation module 532 sends each communication according to a random time offset.

In further embodiments, at stage 650, the attack results module 535 tracks a response of each respective user to the received phishing communication. In some embodiments, the response of each respective user is stored in the database 534.

A specific example of a method for generating a simulated phishing campaign will now be described. A phishing campaign is initiated by an administrator 312 and one or more users within an organization are selected, including an employee called Ada. The administrator further selects a plurality of social engineering techniques, a plurality of message types, and a plurality of difficulty levels and a message frequency. Instructions based on options selected by the administrator 312 are sent to the simulated phishing campaign server 530

At stage 610, the phishing campaign generation module 532 selects one or more users, including Ada, based on instructions received from the administrator device 410.

The phishing campaign generation module 532 determines, based on historical records saved in the user data 542, that the time since Ada last received communication is over a threshold time interval that corresponds to the message frequency. The phishing campaign generation module 532 adds Ada to a list of users scheduled to receive a new communication. The phishing campaign generation module 532 selects a template from the plurality of templates based on a weighted random sampling performed on a lookup table that lists each of the templates and the social engineering technique and message types associated with each respective template. The sampling is restricted to the social engineering techniques and message types selected by the administrator 312. Social engineering techniques and message types corresponding to communications recently sent to Ada are downweighted. A template 750 corresponding to the “Close Colleague Collaboration technique” and “email” is selected.

FIG. 7 illustrates the selected template 750. It can be seen that empty fields of the template 700 indicate what types of data should be input into the empty fields of the template by the message generator 552. The phishing campaign generation module 532 accesses personal data from the user data 542 to supply information for the empty fields {{.FirstName}} and {{.Department}}.

The phishing campaign generation module 532 then accesses user data 542 to identify data relating to the interactions of a user within their organization to fill in the outstanding empty fields of the template. The phishing campaign generation module 532 selects an associate of Ada’s using an exponentially weighted random sampling of all associates based on the collaboration scores.

The phishing campaign generation module 532 identifies a close associate of the user called Bea. The phishing campaign generation module 532 looks up features relating to Bea stored in the user data 542 to provide information for the following empty fields: {{.AssociateName}}, {{.AssociateJobTitle}} and {{.AssociateDepartment}}.

The phishing campaign generation module 532 looks up features associated with both Ada and Bea to fill the fields {{.Task}} and {{.LinkObject}}. Ada and Bea both work in the sales department, where Bea is a Sales Executive. In order to provide information for the fields {{.Department}} and {{.AssociateDepartment}} the phishing campaign generation module 532 runs a lookup against a set of precomputed tasks and sharing objects stored in the user data 542 for Ada and Bea. The empty fields {{.Task}} and {{.LinkObject}} are filled based on the identified precomputed task “review a new reseller agreement” and the sharing objects corresponding to “sharing via Sharepoint”. The completed template 850 is illustrated in FIG. 8. The difficulty level is selected as "hard" and therefore the phishing campaign generation module 532 provides no further edits to the template 850.

At stage 630, the phishing campaign generation module 532 inputs the template 850 to the generative artificial intelligence algorithm 554. The generative artificial intelligence algorithm 554 outputs html code for use as a phishing communication to be sent to Ada by email.

The expression "and/or" used herein in combination with first and second features refers to embodiments comprising either one of the first or second features individually and both of the first and second features in combination. The expression "and/or" used herein in combination with first, second, and third features refers to embodiments comprising one of the first, second, or third features individually, combinations of the first and second, second and third, and first and third features in combination, and all of the first, second and third features in combination.

Implementations described herein make use of generative AI to generate simulated phishing communications based on prompts generated based on user data. The generative AI may include a general purpose generative natural language processing model (e.g. a large language model), or may include a generative AI that has been specifically trained to generate phishing communications. For instance, a general purpose large language model may be fine-tuned to generate improved phishing communications through additional training based on training data including historical communications within the organisation.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method for generating a simulated phishing campaign, the method comprising:

selecting, with a processing circuitry, one or more users from a plurality of users; and for each respective user of the one or more users:

accessing, from a database, with the processing circuitry, data associated with the respective user, wherein the data associated with the respective user comprises a plurality of associates;

selecting, with the processing circuitry, an associate from the plurality of associates, wherein each of the plurality of associates is associated with a collaboration score based upon historical interactions with the respective user, and wherein the associate is selected based upon the collaboration score;

determining, with the processing circuitry, based on a lookup table, one or more features associated with the respective user and said selected associate;

generating, with the processing circuitry and using a generative artificial intelligence algorithm, content of a phishing communication based on the data associated with the respective user, the selected associate and the one or more features associated with the respective user and said selected associate; and sending, with the processing circuitry, over a network environment, a phishing communication comprising the content generated for the respective user to a device associated with the respective user.

2. The method of claim 1, wherein the content of the phishing communication is generated by inputting a prompt into the generative artificial intelligence algorithm, wherein the prompt is based on the data associated with the respective user.

3. The method of claim 2 wherein the prompt is based on a template comprising empty elements, and wherein the prompt comprises the template with the empty elements filled based on the data associated with the respective user.

4. The method of claim 3, wherein the template is selected from a plurality of templates, each of the one or more templates corresponding to a respective social engineering technique of a plurality of social engineering techniques and/or a respective message type of a plurality of message types.

5. The method of claim 4, wherein the template is selected based on one or more social engineering techniques and/or one or more message types determined by an administrator and/or an algorithm, and optionally based on historical user data from previous phishing campaigns.

6. The method of claim 4, wherein the template is selected based on a random sampling of the plurality of templates.

7. The method of claim 6, wherein a respective template is selected for each respective user.

8. The method of claim 7, wherein the random sampling is a weighted random sampling, wherein the weighting is based upon historical data of previous templates selected for the respective user.

9. The method of claim 3, wherein the prompt is modified based on a difficulty level selected from a plurality of difficulty levels.

10. The method of claim 3, further comprising filling, via the simulated phishing campaign server, the empty elements of the template based on the data associated with the respective user prior to inputting the prompt into the generative artificial intelligence algorithm.

11. The method of claim 1, wherein the generative artificial intelligence algorithm is an algorithm trained to generate text-based content in response to a prompt.

12. The method of claim 1, wherein the data associated with each of the one or more users comprises personal data.

13. The method of claim 1, wherein each of the plurality of associates is associated with a collaboration score based upon historical interactions with the respective user, wherein the associate is selected based upon a weighted random sampling of the plurality of associates, and wherein the weighting is based upon the collaboration score.

14. The method of claim 1, wherein a timing of sending each respective phishing communication is based on predefined frequency.

15. The method of claim 14, wherein the timing of sending each respective phishing communication is further based on a random time offset.

16. The method of claim 1, further comprising:

tracking a response of each respective user to the received phishing communication; and storing the response or each respective user in the database.

17. The method of claim 1, further comprising:

performing an automated testing of the content of the phishing communication generated for each respective user to check for errors.

18. The method of claim 1, wherein the data associated with each respective user of the one or more users comprises at least one of demographic data, consumer data, interaction data, calendar data, incoming email data, survey data, and previous phishing campaign responses.

19. The method of claim 1, further comprising receiving, by a simulated phishing campaign server from an administrator device, an input indicative of the plurality of users from an administrator, wherein selecting the one or more users from the plurality of users comprises selecting, via a simulated phishing campaign server, the one or more users from the plurality of users automatically in response to the input, and wherein, for each respective user, automatically performing, via the simulated phishing campaign server:

accessing, from the database, the data associated with the respective user, wherein the data associated with the respective user comprises the plurality of associates;

selecting the associate from the plurality of associates, wherein each of the plurality of associates is associated with the collaboration score based upon historical interactions with the respective user, and wherein the associate is selected based upon the collaboration score;

determining, based on the lookup table, the one or more features associated with the respective user and said selected associate;

generating, with the generative artificial intelligence algorithm, the content of the phishing communication based on the data associated with the respective user, the selected associate and the one or more features associated with the respective user and said selected associate; and sending, over the network environment, the phishing communication comprising the content generated for the respective user to the device associated with the respective user.

20. A system for generating a simulated phishing campaign, the system comprising:

a memory storing a database comprising data associated with a plurality of users; and a processing circuitry configured to, for each respective user of one or more users of the plurality of users:

access data associated with the respective user, wherein the data associated with the respective user comprises a plurality of associates;

select an associate from the plurality of associates, wherein each of the plurality of associates is associated with a collaboration score based upon historical interactions with the respective user, and wherein the associate is selected based upon the collaboration score;

determine, based on a lookup table, one or more features associated with the respective user and said selected associate; and generate, with a generative artificial intelligence algorithm, content of a phishing communication based on the data associated with the respective user, the selected associate and the one or more features associated with the respective user and said selected associate; and send, over a network environment, a phishing communication comprising the content generated for the respective user to a device associated with the respective user.

* * * * *